United States Patent [19]

Splinter

[11] Patent Number: 4,964,677

[45] Date of Patent: Oct. 23, 1990

[54] VEHICLE ANTI-THEFT SYSTEM

[75] Inventor: Bob C. Splinter, Nieuw Vennep, Netherlands

[73] Assignee: H. Van Eldern Holding B.V., Netherlands

[21] Appl. No.: 385,179

[22] Filed: Jul. 26, 1989

[51] Int. Cl.$^5$ .................... B60R 25/08; B60T 17/16
[52] U.S. Cl. .................................. 303/89; 188/265
[58] Field of Search ........................ 303/89; 188/265

[56] References Cited

U.S. PATENT DOCUMENTS

| | | | |
|---|---|---|---|
| 3,515,442 | 6/1970 | Whittemore | 303/89 |
| 3,617,663 | 11/1971 | Whittemore | 303/89 |
| 3,625,573 | 12/1971 | Conn | 303/89 |
| 4,633,686 | 1/1987 | Carr | 303/89 |
| 4,658,608 | 4/1987 | Fox | 303/89 |
| 4,678,068 | 7/1987 | Matthews et al. | 308/89 |

*Primary Examiner*—Robert P. Olszewski
*Assistant Examiner*—Matthew C. Graham

[57] ABSTRACT

Three stacked components are bolted together. The uppermost component supports a key-controlled actuator which vertically shifts three rods. One of the rods operates a switch. Each of the other two rods controls the flow of fluid in a brake line. Each brake line includes parallel passages in the intermediate and lower body components. The parallel passages are interconnectd by a bypass passage of smaller diameter than the parallel passages. The parallel passages are further interconnected by a one-way valve passage downstream of the bypass passage. Each one-way valve passage includes a spring biased ball which permits fluid flow to a brake cylinder but prevents reverse flow. Each of the other two rods is slidable into anti-theft position to block fluid flow through the associated bypass passage, but permitting fluid flow through the associated one-way valve to a brake cylinder.

7 Claims, 2 Drawing Sheets

VEHICLE ANTI-THEFT SYSTEM

BACKGROUND OF THE INVENTION

This invention relates to anti-theft systems for vehicles and is of the type in which the normal brake system of the vehicle is caused automatically to effect a braking action in response to unauthorized use of that vehicle. The system involves mechanism whereby normal operation of the vehicle takes place under conditions in which the brake fluid flow path is characterized by one-way valve mechanism in parallel with a bypass for same so that, in effect, the one-way valve mechanism in ineffective. In the anti-theft operation of the system, the bypass is defeated so that the one-way valve mechanism controls flow of the brake fluid so that it will pass only to the brake slave cylinder with no, or substantially no, return flow.

BRIEF SUMMARY OF THE INVENTION

Of primary concern in connection with this invention is the provision of a simple yet rugged mechanism for effecting anti-theft functions for a vehicle. In this connection, the device according to this invention embodies a multiple-component construction, one component containing a movable actuator and two components containing valving and valve passage mechanism.

The components are in stacked relation to allow two legs of the brake fluid flow path to be separated and to be in parallel relationship with an intervening bypass path therebetween when the system is in its normal condition. An actuator is provided to extend through one leg and into the bypass path when the system is in its anti-theft condition. Such leg is of larger diameter than the actuator to create a restricted brake fluid passage past the actuator, through the one-way valve, and to the vehicle brakes when the system is in its anti-theft condition. The restriction to the brake fluid passage is such as to permit application of the brakes albeit under heavier pedal pressure due to the restriction and the one-way prevention of return flow assures that the brakes remain "on", thus defeating unauthorized use of the vehicle.

In another aspect, the invention may be said to consist of an anti-theft system for vehicles wherein one-way valve mechanism is used to prevent unauthorized use of the vehicle, in association with a bypass system which normally permits proper operation unaffected by the one-way valve mechanism, in conjunction with means for severely restricting flow of fluid through the bypass system in order to effect the anti-theft control.

BRIEF DESCRIPTION OF THE DRAWING FIGURES

FIG. 1 is an elevational view, partly in section, showing details of construction of the invention; and FIG. 2 is a view taken along section line 2—2 in FIG. 1.

DETAILED DESCRIPTION OF THE INVENTION

Figure 1:
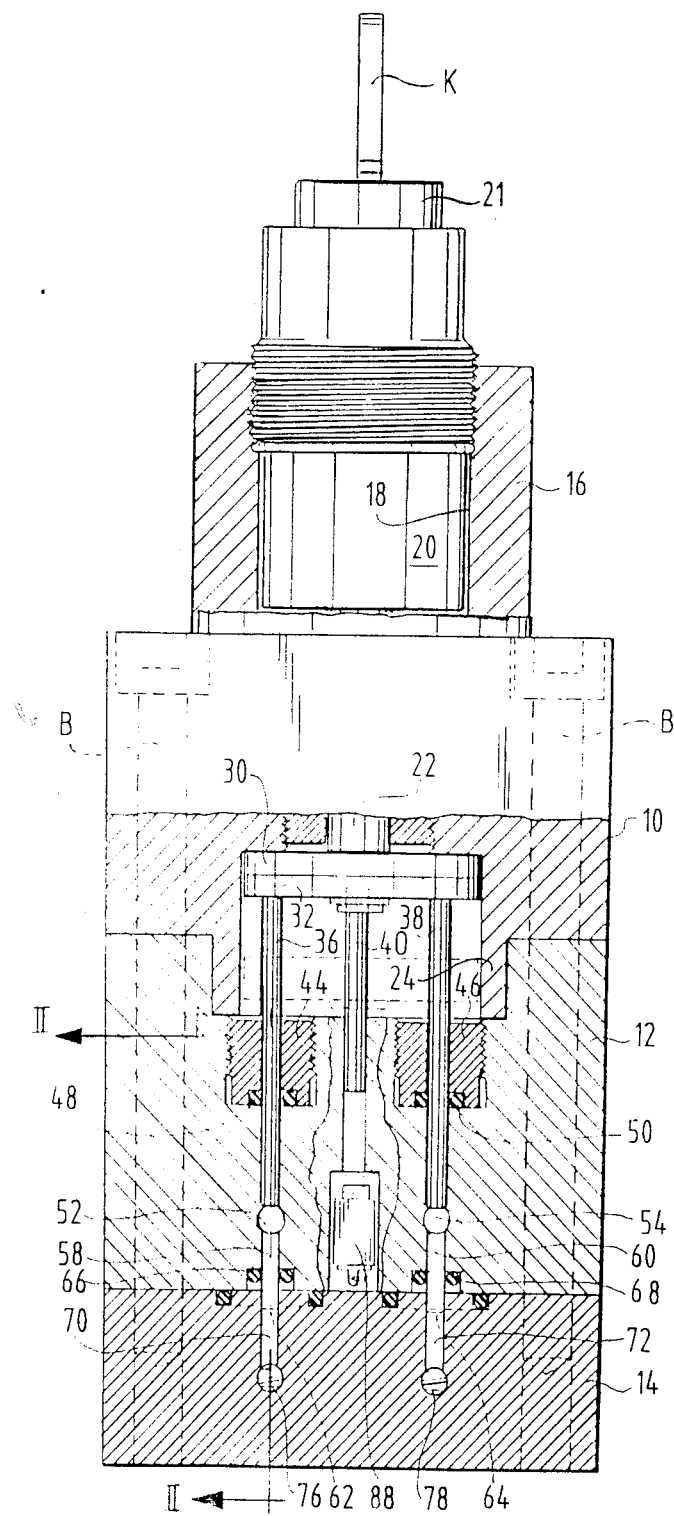
Figure 2:
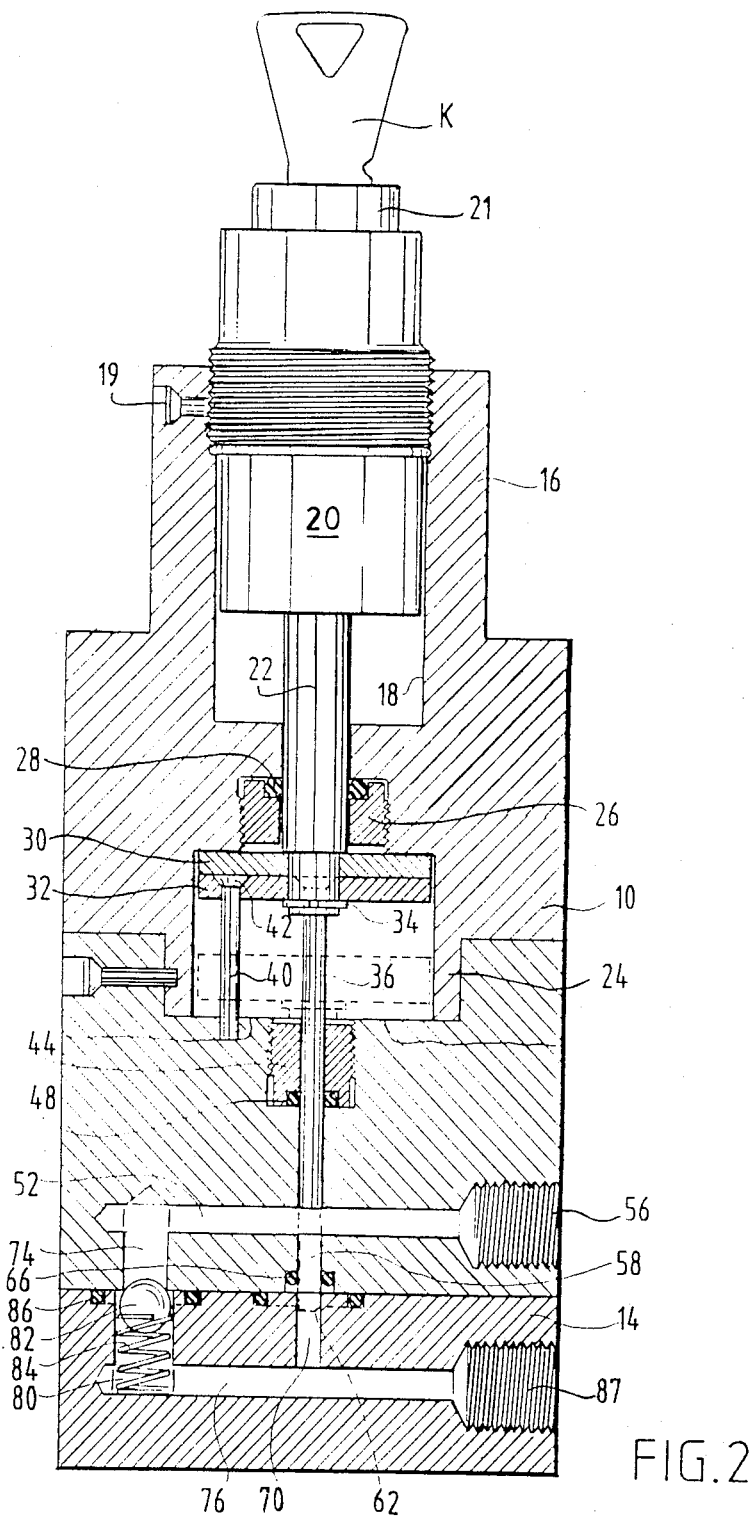

Referring to both FIGS. 1 and 2, the invention will be seen to consist of a body of preferably rectangular form and encompassing an upper component 10, an intermediate component 12 and a bottom component 14. The upper component 10 has a preferably cylindrical extension 16 which is provided with a cylinder space 18 which receives the key-controlled mechanism 20 of conventional nature. That is, the mechanism 20 is externally threaded and pinned in place as shown at 19, and includes the locking barrel 21 which is rotatable when manipulated by the key K and depressed to linearly shift the actuator 22 when in the locked condition. That is, upon turning the key K relative to the body and depressing it, the actuator 22 is linearly under control of the key K for locking and unlocking the anti-theft system.

The upper component includes a cylindrical boss 24 seated within the intermediate portion 12 and serves to position these components in proper registry. The uppermost portion 10 is provided with a threaded bushing 26 and cooperating O-ring seal 28 receiving the actuator 22. The actuator 22 is also provided with a pair of annular plates 30 and 32 retained on a reduced end portion of the actuator 22 by the circlip 34 and which plates 30 and 32 serve to sandwich the heads of actuator rods 36, 38 and 40 therebetween. The actuator rods 36 and 38 preferably are diametrically disposed and the actuator rod 40 is laterally offset therefrom but it too has a tapered head 42 sandwiched between the plates 30 and 32.

The three portions 10, 12 and 14 are tightly held in stacked condition and in the proper rotational orientation by four bolts B positioned at the corners of the rectangular housing.

The intermediate portion 12 is provided with two threaded bores diametrically offset from each other receiving the respective threaded bushings 44 and 46 which serve to guide the respective actuator rods 36 and 38 and which bushings 44 and 46 are provided with respective O-rings 48 and 50 to seal around the actuator rods 36 and 38.

The respective actuator rods 36 and 38 cooperate with the passages 52 and 54 which are of diameters slightly larger than the diameters of the respective actuator rods 36 and 38. In the retracted positions of the actuator rods 36 and 38 as is shown in full lines in the drawings, their lower extremities do not pass through the passages 52 and 54 but leave them unrestricted. Therefore, with the actuator rods thus retracted the braking system will operate normally. That is to say, a brake line inlet nipple connection to the threaded inlet 56 of the passage 52 and a similar nipple connection for the passage 54, will allow brake fluid to flow freely down the passages 52 and 54 to the bypass connections 58 and 60. However, when the actuator rods are actuated by the locking mechanism to the dashed line positions thereof with their extremities 62 and 64 extending past the sealing O-rings 66 and 68 and into the bypass extensions 70 and 72, brake fluid can no longer pass through the bypass connections 58 and 60. Instead, if the brake pedal is actuated, brake fluid will pass through the inlets 56, down the passages 52 and 54 past the actuator rods 36 and 38, and through the respective one-way valve passages, one of which is designated by the reference character 74 in FIG. 2. The lowermost component 14 contains the aforesaid bypass passages 70 and 72 and the outlet passages 76 and 78 with which the intersect and, in addition, the one-way valve passages to the respective passages 52 and 54, one of which is indicated at 80 in FIG. 2.

The passages 80 are larger than their cooperating passages 74 so as to form a valve seat in each passage pair 74, 80 and in which a one-way ball valve is seated, as is illustrated at 82 in FIG. 2. A compression spring 84 holds the ball valve in place upon its seat and a sealing ring 86 cooperates with each ball valve to prevent leakage between the two components 12 and 14. FIG. 2 illustrates that the outlet passages 76 and 78 are provided with threaded outlets 87 for connection to the brake lines which extend to the wheel cylinders of the vehicle.

Lastly, reference to FIG. 1 will illustrate that the actuator rod 40 is movable to the dashed line position shown to actuate the microswitch 88 which may be used for indicator purposes to apprise the operator that the anti-theft system is "on".

It will be appreciated that the assembly which constitutes the novel structure of this invention is extremely simple to manufacture and yet fully effective to achieve the intended purposes. It is a simple matter to drill blind holes such as 52 and 76 in two separate components that are to be mated together while disposing them in generally parallel relation such that the bypass passages 58 and 70 and the one-way passages 74 and 80 can also be drilled with accuracy. The actuator rods 36 and 38 can be made very accurately and can be made any desired amount smaller than the passages 52 and 54. The amount of restriction the actuator rods 36 and 38 provide for the passages 52 and 54 may be rather large so that although the brakes will be operated through the one-way valves when the brake pedal is depressed, it will require rather heavy pressure on the brake pedal to do so. The important feature is that the bypass passages, such as 58 and 60, are blocked, or substantially blocked, when the actuator rods are in the anti-theft position.

It will be appreciated that the fluid lines which are to be controlled in accord with this invention are preferably the brake line or lines associated with the vehicle. Other vehicle-related fluid lines may be controlled, as, for example, a hydraulic clutch line in the unusual event that such a clutch is employed. A one-way valve system and bypass system maybe used for each of the front and rear brake lines normally used contemporarily in automotive type vehicles and as is illustrated in that drawings herein. The exact mechanism used for moving the actuator rod or rods between normal and anti-theft positions may be selected as desired. Perhaps the simplest form is a key-controlled locking mechanism as is illustrated in the drawings, but the mechanism which linearly controls the actuator rod or rods may be hydraulically or electrically operated without altering the scope of the invention.

Also, it is within the scope of the invention to allow a slight bleed-back of the actuating fluid in the bypass line or lines, or to permit this action at the one-way valve or valves, to eliminate the condition whereby the brake-slave cylinders are locked under maximum pressure which can be applied by the brake pedal. The bleed-back need not amount to much in order to achieve its objective and, in any event, will not defeat the purpose of the anti-theft system.

In considering this invention, the above disclosure is intended to be illustrative only and the scope and coverage of the invention should be construed and determined by the following claims.

What is claimed is:

1. A vehicle anti-theft system comprising in combination, a body having at least two components and means for holding said components in sealingly stacked relation, one of said components having a first passage therein and the other of said components having a second passage therein, a first bypass passage intersecting the first passage and being of a smaller diameter than said first passage, a second bypass passage in the other component aligned with said first bypass passage, actuator rod means slidable in said bypass passages between a normal position allowing free fluid flow through said bypass passages and an anti-theft position substantially blocking fluid flow through said bypass passages, said one passage having a first one-way valve passage downstream from said first bypass passage, said second passage having a second one-way valve passage aligned with said first one-way valve passage but of larger diameter than said first one-way valve passage, ball valve means in said second one-way valve passage for sealing against reverse flow of fluid through said one-way valve passages, means for seating said ball valve means against said one component, and operator actuated means for locking said actuator rod in said anti-theft position.

2. An anti-theft system for vehicles as defined in claim 1 wherein said components are mated together at flat faces thereof, said first and second passages being parallel to such flat faces and said bypass passages and said one-way valve passages being perpendicular thereto.

3. The anti-theft system as defined in claim 2 including O-ring sealing means sealingly cooperating with said bypass passages and said one-way valve passages to prevent loss of fluid between the components.

4. The anti-theft system as defined in claim 3 including an O-ring seal in said first bypass passage for sealingly surrounding said actuator rod when in said anti-theft position.

5. The anti-theft system as defined in claim 4 including an upper component stacked upon said one component and having a recess therein, a piston-like member reciprocable in said recess, said actuator rod being connected to said piston-like member.

6. The anti-theft system as defined in claim 5 including a bushing in said one component and through which said actuator rod extends, and an O-ring carried by said bushing in surrounding relation to said actuator rod.

7. The anti-theft system as defined in claim 6 including a key-controlled mechanism for linearly moving said actuator rod.

* * * * *